Oct. 27, 1925.
1,558,564
H. NYQUIST
ELECTRICAL TESTING SYSTEM
Filed July 16, 1921
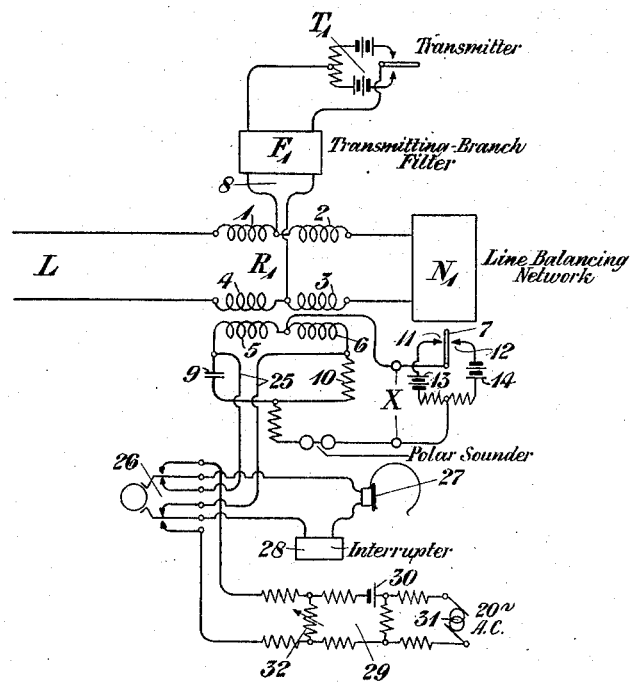
INVENTOR
H. Nyquist
BY
ATTORNEY Patented Oct. 27, 1925.

1,558,564

UNITED STATES PATENT OFFICE.

HARRY NYQUIST, OF ELMHURST, NEW YORK, ASSIGNOR TO AMERICAN TELEPHONE AND TELEGRAPH COMPANY, A CORPORATION OF NEW YORK.

ELECTRICAL TESTING SYSTEM.

Application filed July 16, 1921. Serial No. 485,309.

*To all whom it may concern:*

Be it known that I, HARRY NYQUIST, residing at Elmhurst, in the county of Queens and State of New York, have invented certain Improvements in Electrical Testing Systems, of which the following is a specification.

This invention relates to electrical testing systems and particularly to an arrangement for determining the degree of unbalance between two networks, such as a signal transmission line and a network designed to balance the said line.

In the copending application of Cory, Serial No. 485,207, filed July 16, 1921, there was disclosed a simple arrangement for detecting the presence of unbalance between a signaling circuit and an artificial line or balancing network intended to balance the signaling circuit. It is the object of the present invention to provide an arrangement which not only indicates the existence of unbalance but also determines its magnitude.

This invention will be better understood from the following description when read in conection with the attached drawing, which shows the terminal apparatus of a metallic duplex telegraph circuit which is arranged for the measurement of the unbalance that exists between the line balancing network $N_1$ and the line L.

In the figure, L represents a duplex telegraph signaling circuit having associated therewith a line balancing network $N_1$. Interposed between the said line and its network is a relay $R_1$ having line windings 1, 2, 3 and 4 connected in series therewith, and windings 5 and 6 connected in what is known as the vibratory circuit. All of the windings set forth above are wound upon the same magnetic core, the magnetic changes of which are intended to control the action of the armature 7. Bridged across the junction points of the windings 1—2 and windings 3—4 is the transmitter circuit 8, which has associated therewith a transmitter $T_1$ and a transmitting branch filter $F_1$, the function of which is to round off the signaling impulses created by the transmitter $T_1$. When it is desired to measure unbalance between the line and its network, the circuit of relay $R_1$ is either disconnected at the points marked "X", or the batteries 13 and 14 are disconnected so as to have no effect on the vibratory circuit. Bridged across the vibratory circuit which includes the windings 5 and 6 are the conductors 25 which are connected with the inner contacts of the switch 26. The swinging contacts of this switch are connected with the receiver 27 and a high frequency interrupter 28. Connected with the outer contacts of the switch 26 is a network 29 having a variable resistance bridged across its two sides and also having associated therewith a source of D. C. voltage 30 and a source of low frequency A. C. voltage 31, which may be of about 20 cycles frequency. The function of the network 29 and its associated sources of potential is to produce an electromotive force of variable magnitude and wave shape such as to approximately simulate the wave shape of the unbalance currents. This electromotive force is obtained by superimposing an alternating current of the frequency of 20 cycles per second upon a direct current of a potential of about two volts. The resistances shown in the network may be so adjusted that the relative magnitudes of the two components of electromotive force may have any desired values.

The circuit connected with the distant end of the line L, would in general be the same as shown in the figure except that the receiving circuit would not be opened as at X, and there would be no measuring circuit connected across the vibratory circuit as represented by the conductors 25 in the figure.

Having in mind the foregoing description of the circuit shown in the figure the invention will be clearly understood from the following description of the mode of operation of the circuit.

Let it be assumed that telegraph signals, such as a series of reversals, are set up by the transmitter $T_1$ and impressed by the output circuit 8 across the junction points of the windings 1—2 and 3—4 respectively. The current from the source will divide, part of it flowing through the windings 1 and 4 and the line L and the other part will flow through the windings 2 and 3 and the line balancing network $N_1$. If the impedance of the balancing network at a definite frequency exactly equals that of the line L at the same frequency, the currents in the two paths will be equal and no resultant magnetization of the core would occur. Since, however, an unbalance usually exists, the difference in the currents will induce a difference of potential in the windings 5 and 6 which are connected in the vibratory circuit. This induced potential will cause a flow of current through a circuit comprising the windings 5 and 6, the conductors 25, the inner contacts of the switch 26 and the receiver 27 and the interrupter 28. The function of the interrupter is to break up the low frequency currents which have been induced in the windings 5 and 6 by the operation of the transmitter $T_1$, thereby rendering audible these low frequency currents. If the switch 26 is operated so as to move the swinging members to their outer contacts, the circuit containing the receiver 27 and the interrupter 28 will be connected with the network 29 comprising the source of comparative electromotive force. By adjusting the variable resistance element 32 associated with the source 29 while operating the switch 26 at a uniform rate, a point of adjustment of the resistance 32 will be reached where the tone produced by the receiver 27 will be the same whether connected with the conductors 25 or with the source of comparative electromotive force 29. The reading of the adjustable element 32 indicates the extent of the unbalance existing between the net-work $N_1$ and the line L. The network should then be adjusted so as to tend more nearly to balance the line L, and the test previously described should be repeated. By a series of tests and adjustments of the balancing network, the unbalance between a line circuit and its corresponding network may be reduced to as low a value as can be obtained through the use of the distortion bridge arrangement described in the patent to Nyquist 1,435,328, dated November 14, 1922. The source of comparative electromotive force which is represented in the drawing by the network 29, including the battery 30 and the source of alternating currents 31 may be replaced by an equivalent source comprising a polechanger having a suitable network associated therewith to produce a suitable wave shape, such as, for example, a condenser connected in series with the pole-changer. This pole-changer might be connected in a manner so as to be operated by the signal that is used in effecting the balance and thus better simulation of quality might be obtained.

Although this invention has been disclosed in connection with a duplex metallic telegraph circuit, it is to be understood that it is not limited to such particular type of circuit but is capable of embodiment in other and different forms of circuits without departing from the spirit and scope of the appended claims.

What is claimed is:

1. In an electrical testing system, the combination with a line circuit, of a balancing network, a signal transmitting circuit, a signal receiving circuit, both effectively connected with the said line circuit and said network, and means connected with the said receiving circuit to measure the magnitude of the unbalance between the said line circuit and the said network resulting from the transmission of telegraph signal impulses, the said means including a source of potential for comparison with the potential set up in said receiving circuit by unbalance between the line circuit and the said network, and means for varying the magnitude of the potential from said source.

2. In an electrical testing system, the combination with a line circuit of a balancing network, a transmitting circuit, a receiving circuit inductively related with each of the other of said circuits, means connected with the said receiving circuit for indicating the difference between the current flowing from the said transmitting circuit through the said line circuit and through the said balancing network, and a source of comparative current to measure the magnitude of the unbalance current.

3. In an electrical testing system, the combination with a line circuit of a network designed to substantially balance the said line circuit, a transmitting circuit, a receiving circuit, the said receiving circuit being so related to the said line circuit and the said network that the impression by the said transmitting circuit of a voltage across the said line circuit and the said network will produce a voltage in the said receiving circuit if the said network fails to balance the said line circuit, a variable source of comparative potential, and a current-indicating device adapted for alternate connection with the said source of comparative potential and the said receiving circuit to indicate balance between the potential of said source and the unbalance potential of said receiving circuit.

4. In an electrical testing system, the combination with a transmitting circuit, of a plurality of networks in parallel therewith, a receiving circuit inductively related to the other of said circuits, and neutral with respect to transmitted signals if the said networks are balanced, and means connected with the said receiving circuit to determine the magnitude of the unbalance currents flowing therein, said means comprising a detecting circuit and a source of comparative E. M. F., and switching means for alternately connecting the said detecting circuit with the said receiving circuit and with the said source of comparative E. M. F.

5. In a duplex telegraph signaling system, comprising a line circuit, a balancing network, a transmitting circuit and a receiving circuit characterized by freedom from transmitting interference when the said network balances its line circuit, the method of determining the magnitude of unbalance between the network and its line circuit, which consists in impressing a signaling wave across the said line circuit and its network in parallel, connecting a detecting circuit alternately across the receiving circuit and across the source of comparative E. M. F. and adjusting the magnitude of the latter until the tone in the receiver is the same when connected with the receiving circuit and with the said source.

In testimony whereof, I have signed my name to this specification this 15th day of July, 1921.

HARRY NYQUIST.